(12) United States Patent
Park et al.

(10) Patent No.: US 12,081,042 B2
(45) Date of Patent: Sep. 3, 2024

(54) WIRELESS POWER RECEPTION DEVICE, WIRELESS POWER TRANSMISSION DEVICE, AND METHOD FOR TRANSMITTING/RECEIVING MESSAGES BETWEEN WIRELESS POWER RECEPTION DEVICE AND WIRELESS POWER TRANSMISSION DEVICE USING DATA TRANSMISSION STREAM

(71) Applicant: LG ELECTRONICS INC., Seoul (KR)

(72) Inventors: Yongcheol Park, Seoul (KR); Gyunghwan Yook, Seoul (KR); Jinho Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 17/799,813

(22) PCT Filed: Feb. 17, 2021

(86) PCT No.: PCT/KR2021/002015
§ 371 (c)(1),
(2) Date: Aug. 15, 2022

(87) PCT Pub. No.: WO2021/167341
PCT Pub. Date: Aug. 26, 2021

(65) Prior Publication Data
US 2023/0078771 A1    Mar. 16, 2023

Related U.S. Application Data

(60) Provisional application No. 62/977,669, filed on Feb. 17, 2020.

(51) Int. Cl.
*H02J 50/80* (2016.01)
*H02J 50/10* (2016.01)
(Continued)

(52) U.S. Cl.
CPC .............. *H02J 50/80* (2016.02); *H04L 69/24* (2013.01); *H02J 50/10* (2016.02); *H02J 50/402* (2020.01)

(58) Field of Classification Search
CPC .......... H02J 50/80; H02J 50/10; H02J 50/402; H04L 69/24
See application file for complete search history.

(56) References Cited

U.S. PATENT DOCUMENTS

2020/0382167 A1* 12/2020 Park .................... H02J 7/00045
2022/0014234 A1*  1/2022 Choi ................... H02J 7/00034

FOREIGN PATENT DOCUMENTS

KR        10-1835034 B1     3/2018
KR     10-2019-0138631 A    12/2019
(Continued)

*Primary Examiner* — Jared Fureman
*Assistant Examiner* — Duc M Pham
(74) *Attorney, Agent, or Firm* — BRYAN CAVE LEIGHTON PAISNER LLP

(57) ABSTRACT

A wireless power reception device according to an embodiment of the present document comprises: a power pickup circuit which receives wireless power from a wireless power transmission device; and a communication/control circuit which communicates with the wireless power transmission device and controls the wireless power, wherein the communication/control circuit may transmit and receive application-level messages with the wireless power transmission device by using a data transport stream including an auxiliary data control (ADC) packet and a plurality of continuous auxiliary data transmission (ADT) packets, and transmits a data packet including information about the maximum size of the ADT packet to the wireless power transmission device.

15 Claims, 15 Drawing Sheets

(51) Int. Cl.
*H02J 50/40* (2016.01)
*H04L 69/24* (2022.01)

(56) References Cited

FOREIGN PATENT DOCUMENTS

| WO | 2017/048078 A1 | 3/2017 | | |
|----|----|----|----|----|
| WO | 2018/008919 A1 | 1/2018 | | |
| WO | WO-2019039898 A1 | * | 2/2019 | .............. H02J 50/10 |

* cited by examiner

FIG. 3b

|  | b7 | b6 | b5 | b4 | b3 | b2 | b1 | b0 |
|---|---|---|---|---|---|---|---|---|
| Byte 0 | \multicolumn{8}{c}{Application Profile} |
| Byte 1 | \multicolumn{8}{c}{Version} |
| Byte 2-N-1 | \multicolumn{8}{c}{Profile-specific data} |

FIG. 11

| | b7 | b6 | b5 | b4 | b3 | b2 | b1 | b0 |
|---|---|---|---|---|---|---|---|---|
| B0 | Request | | | | | | | |
| B1 | Parameter (mbs) | | | | | | | (lsb) |

| | Request | Parameter |
|---|---|---|
| $b_0$ | | |
| $b_1$ | | |
| $b_2$ | | |
| $b_3$ | | |
| $b_4$ | | |
| $b_5$ | | |
| $b_6$ | | |
| $b_7$ | | |
| | $B_0$ | $B_1$ |

WIRELESS POWER RECEPTION DEVICE, WIRELESS POWER TRANSMISSION DEVICE, AND METHOD FOR TRANSMITTING/RECEIVING MESSAGES BETWEEN WIRELESS POWER RECEPTION DEVICE AND WIRELESS POWER TRANSMISSION DEVICE USING DATA TRANSMISSION STREAM

CROSS-REFERENCE TO RELATED APPLICATIONS

This application is a National Stage Filing Under 35 U.S.C. 371 of International Application No. PCT/KR2021/002015, filed on Feb. 17, 2021, which claims the benefit of U.S. Provisional Application No. 62/977,669, filed on Feb. 17, 2020, the contents of which are all hereby incorporated by reference herein in their entirety.

BACKGROUND OF THE DISCLOSURE

Field of the Disclosure

This specification relates to a wireless power receiver, a wireless power transmitter, and a method for transmitting/receiving a message between a wireless power receiver and a wireless power transmitter using a data transport stream.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

The technical problem of the present specification is to provide wireless power receiver, wireless power transmitter and data transport stream method between wireless power receiver and wireless power transmitter using the same, which can limit the maximum size of auxiliary data transmission (ADT) packet transmitted by the wireless power transmitter.

The technical problems of the present specification are not limited to the problems mentioned above, and other problems not mentioned will be clearly understood by those skilled in the art from the following description.

A wireless power receiver according to an embodiment of the present specification for solving the above problems comprises a power pickup circuit configured to receive the wireless power from the wireless power transmitter and a communication/control circuit configured to communicate with the wireless power transmitter and control the wireless power, wherein the communication/control circuit is configured to be available for transmitting and receiving an application-level message to and from the wireless power transmitter using a data transport stream including an auxiliary data control (ADC) packet and a plurality of auxiliary data transport (ADT) packets which is consecutive, and transmit a data packet including information for a maximum size of an ADT packet to the wireless power transmitter.

A method according to an embodiment of the present specification for solving the above problems is a method performed by a wireless power receiver of receiving a message from a wireless power transmitter using a data transport stream including a plurality of auxiliary data transport (ADT) packets which is consecutive, the method comprises transmitting, to the wireless power transmitter, a data packet including information for a maximum size of an ADT packet that can be transmitted by the wireless power transmitter, receiving, from the wireless power transmitter, a first auxiliary data control (ADC) packet for opening the data transport stream, transmitting, to the wireless power transmitter, a response packet for the first ADC packet, receiving, from the wireless power transmitter, the plurality of ADT packets of less than or equal to the maximum size, transmitting, to the wireless power transmitter, a response packet for each of the plurality of ADT packets, receiving, from the wireless power transmitter, a second ADC packet for ending the data transport stream and transmitting, to the wireless power transmitter, a response packet for the second ADC packet.

A wireless power transmitter according to an embodiment of the present specification for solving the above problems comprises a power conversion circuit configured to transmit the wireless power to the wireless power receiver and a communication/control circuit configured to communicate with the wireless power receiver and control the wireless power, wherein the communication/control circuit is configured to be available for transmitting and receiving an application-level message to and from the wireless power receiver using a data transport stream including an auxiliary data control (ADC) packet and a plurality of auxiliary data transport (ADT) packets which is consecutive, receive a data packet including information for a maximum size of an ADT packet from the wireless power receiver, and transmit the ADT packet having a size less than or equal to the maximum size to the wireless power receiver.

A method according to an embodiment of the present specification for solving the above problems is a method performed by a wireless power transmitter of transmitting a message to a wireless power receiver using a data transport stream including a plurality of auxiliary data transport (ADT) packets which is consecutive, the method comprises receiving, from the wireless power receiver, a data packet including information for a maximum size of an ADT packet, transmitting, to the wireless power receiver, a first auxiliary data control (ADC) packet for opening the data transport stream, receiving, from the wireless power receiver, a response packet for the first ADC packet, transmitting, to the wireless power receiver, the plurality of ADT packets of less than or equal to the maximum size, receiving, from the wireless power receiver, a response packet for each of the plurality of ADT packets, transmitting, to the wireless power receiver, a second ADC packet for ending the data transport stream and receiving, from the wireless power receiver, a response packet for the second ADC packet.

Other specific details of this specification are included in the detailed description and drawings.

Advantageous Effects

The maximum size of an auxiliary data transport (ADT) packet transmitted by the wireless power transmitter may be limited.

Since the wireless power receiver can limit the maximum size of the auxiliary data transport (ADT) packet transmitted by its wireless power transmitter, even in the process of receiving the data transport stream, the transmission period of the control error (CE) data packet or the receive power (RP) data packet may be normally maintained.

Effects according to the present specification are not limited by the contents exemplified above, and more various effects are included in the present specification.

BRIEF DESCRIPTION OF THE DRAWINGS

FIG. 3*b* shows an example of a WPC NDEF in a wireless power transfer system.

FIG. 11 is a diagram illustrating a format of a message field of an ADC data packet according to an embodiment.

FIG. 12 is a diagram illustrating a format of a message field of an ADT data packet according to an embodiment.

FIG. 14 is a diagram illustrating a format of a message field of an SRQ packet according to an example.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
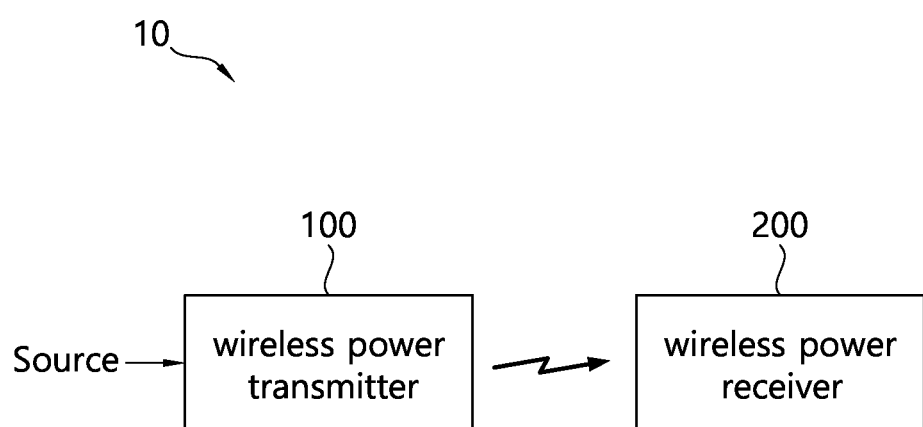
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
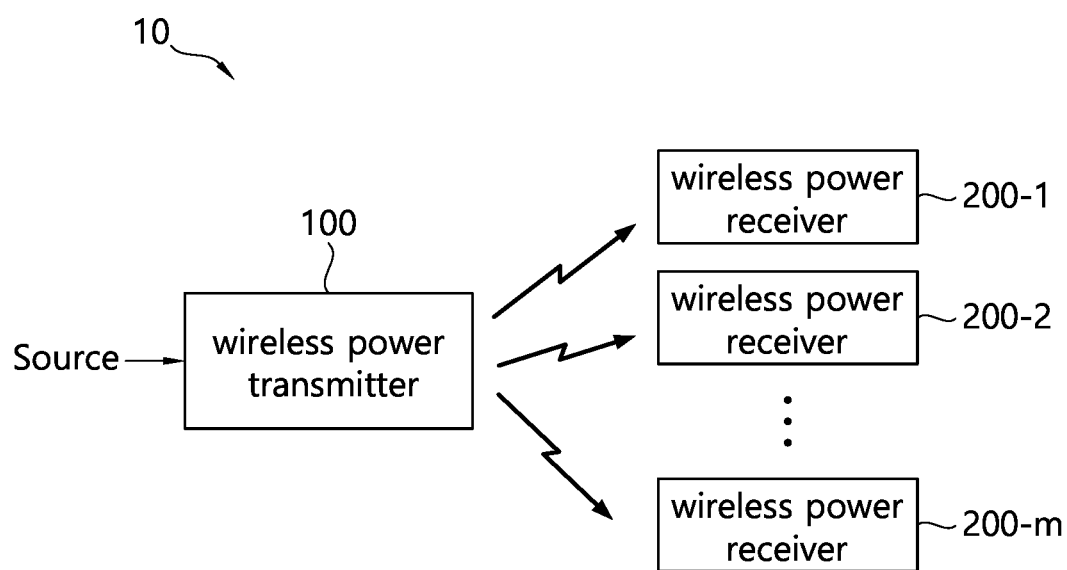
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
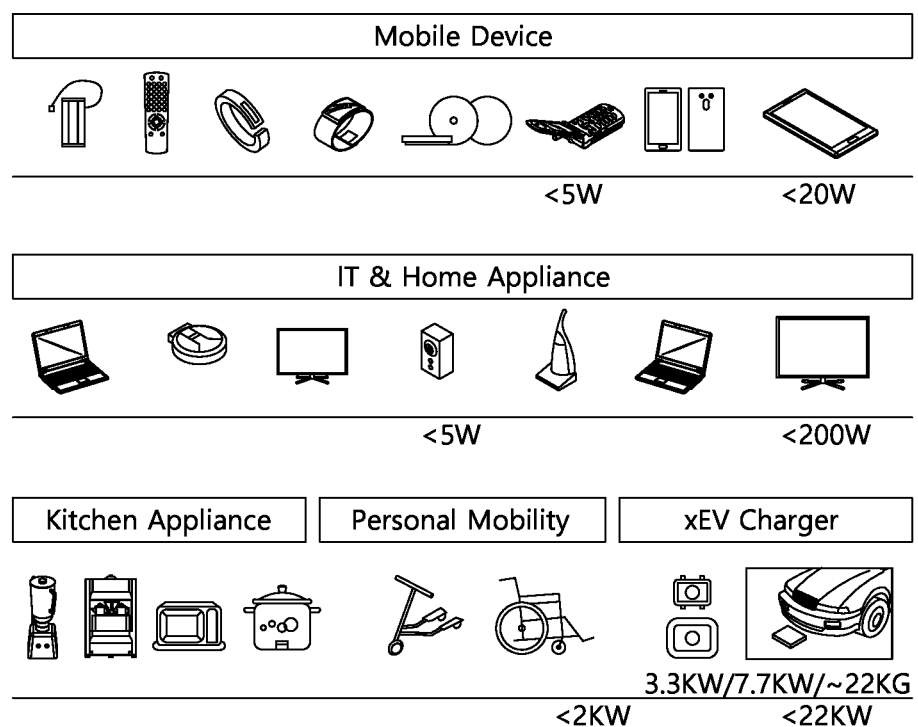
FIG. 3*a* shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3a, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select" Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4:
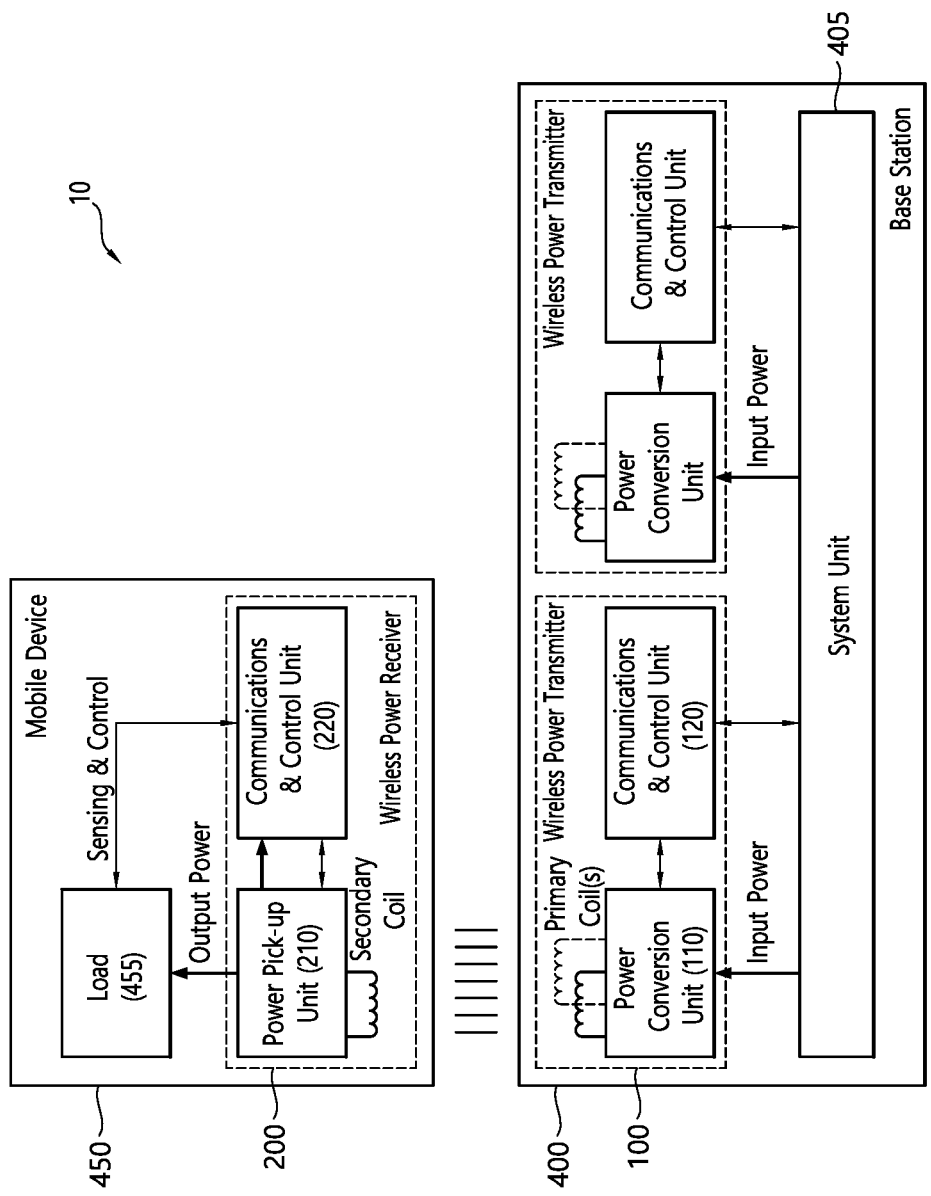
FIG. 4 is a block diagram of a wireless power transfer system according to another exemplary embodiment of the present disclosure.

FIG. 4 is a block diagram of a wireless power transfer system according to another exemplary embodiment of the present disclosure.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Referring to FIG. 4, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
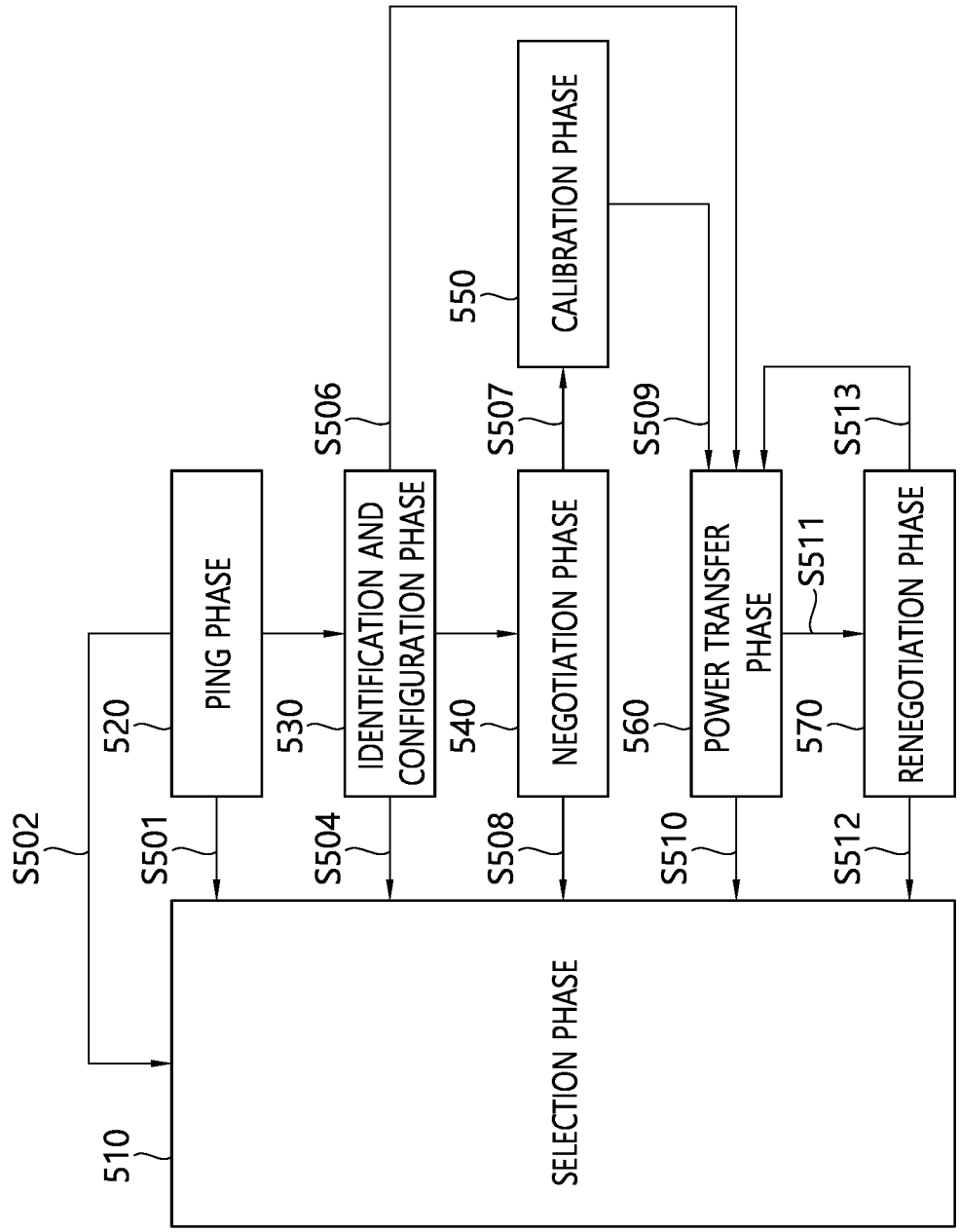
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet— from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
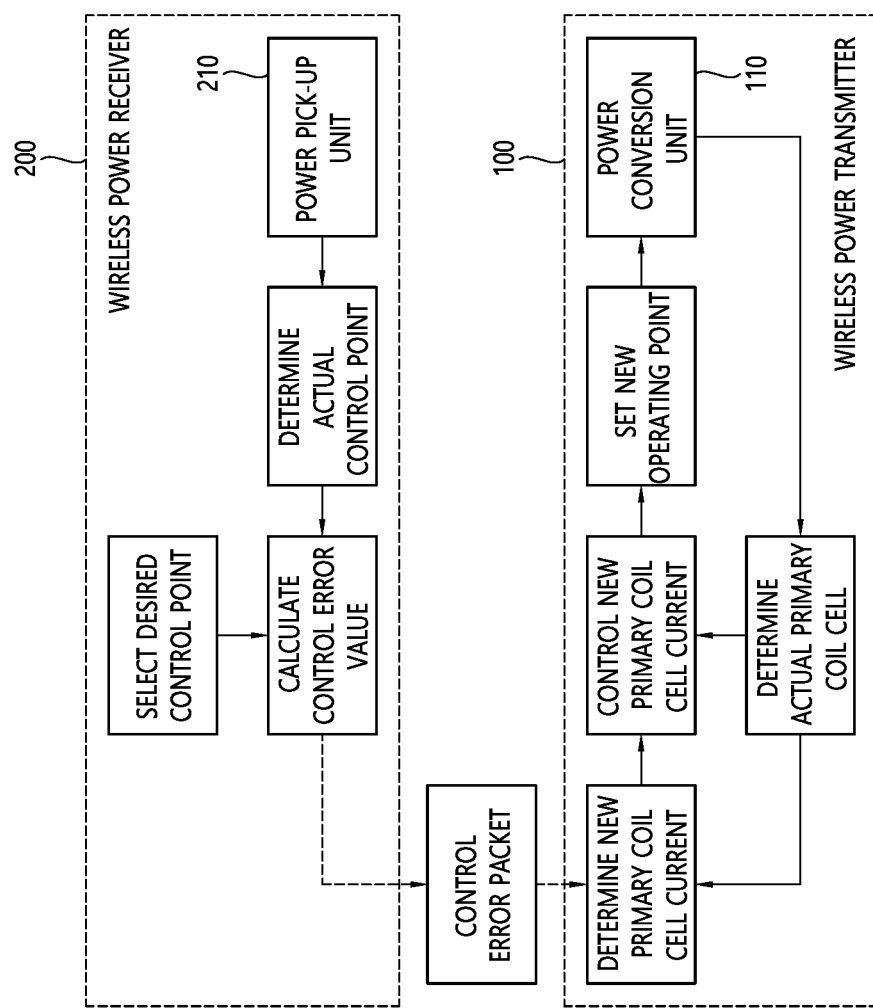
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
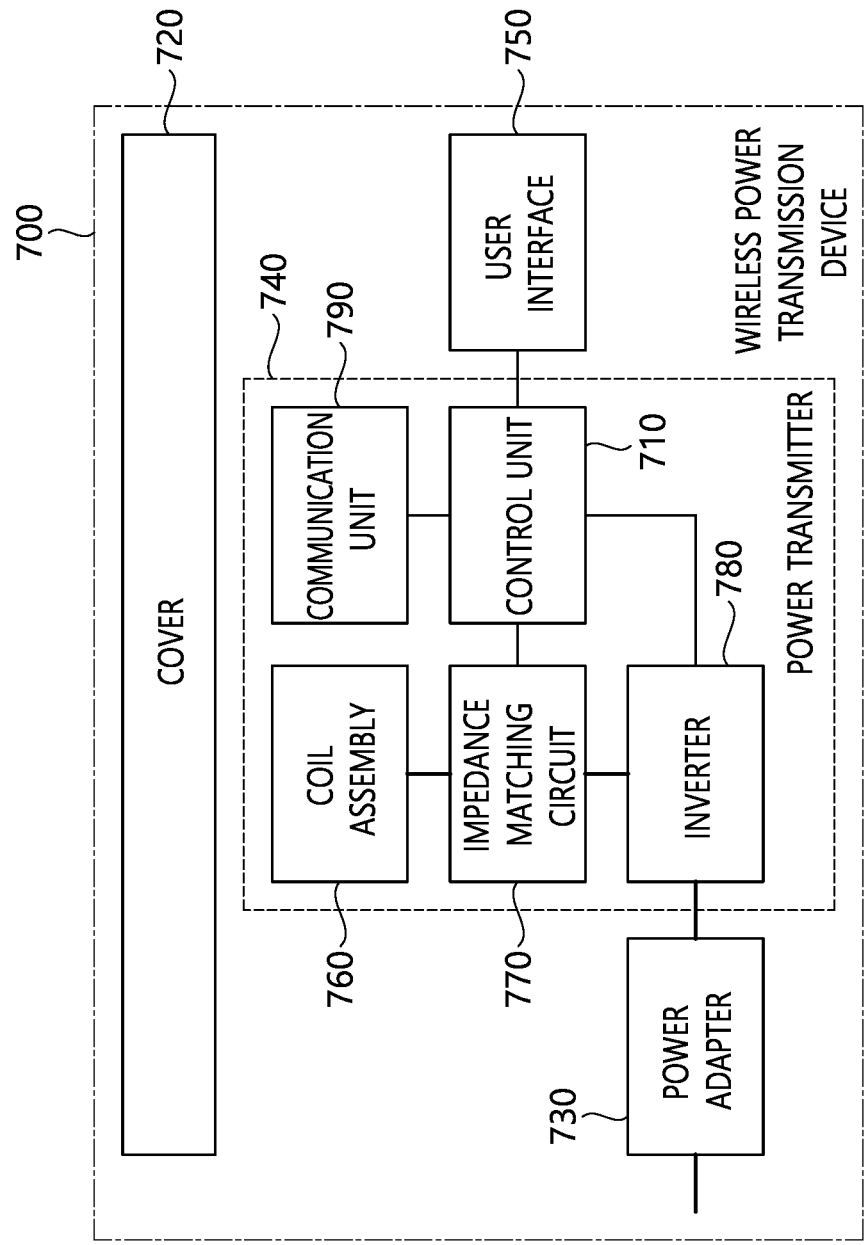
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
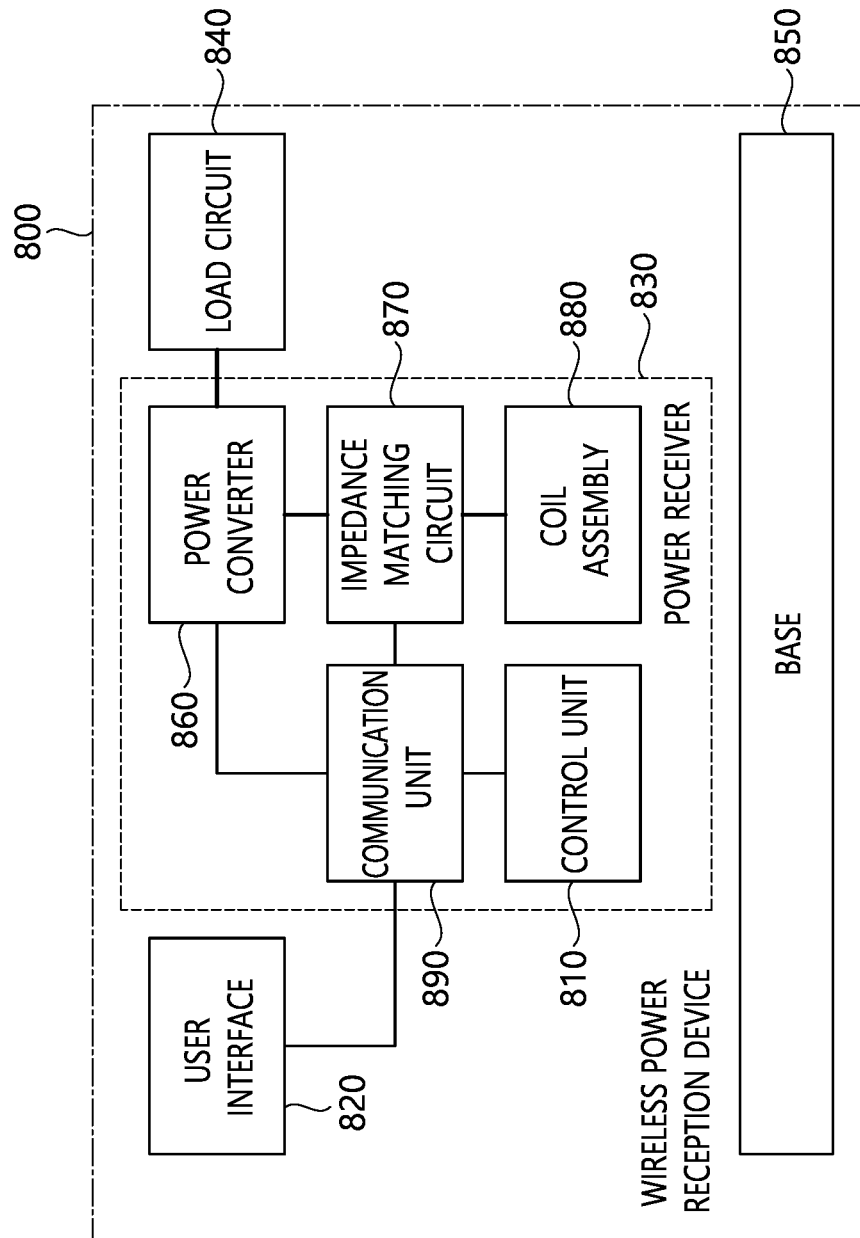
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

The wireless power transfer system may have an application layer message exchange function to support extension to various application fields. Based on this function, device authentication-related information or other application-level messages may be transmitted/received between the wireless power transmitter and the receiver. In order to exchange messages of a higher layer between the wireless power transmitter and the receiver as described above, a separate hierarchical architecture for data transmission is required, and an efficient management and operation method of the hierarchical architecture is required.

Figure 9:
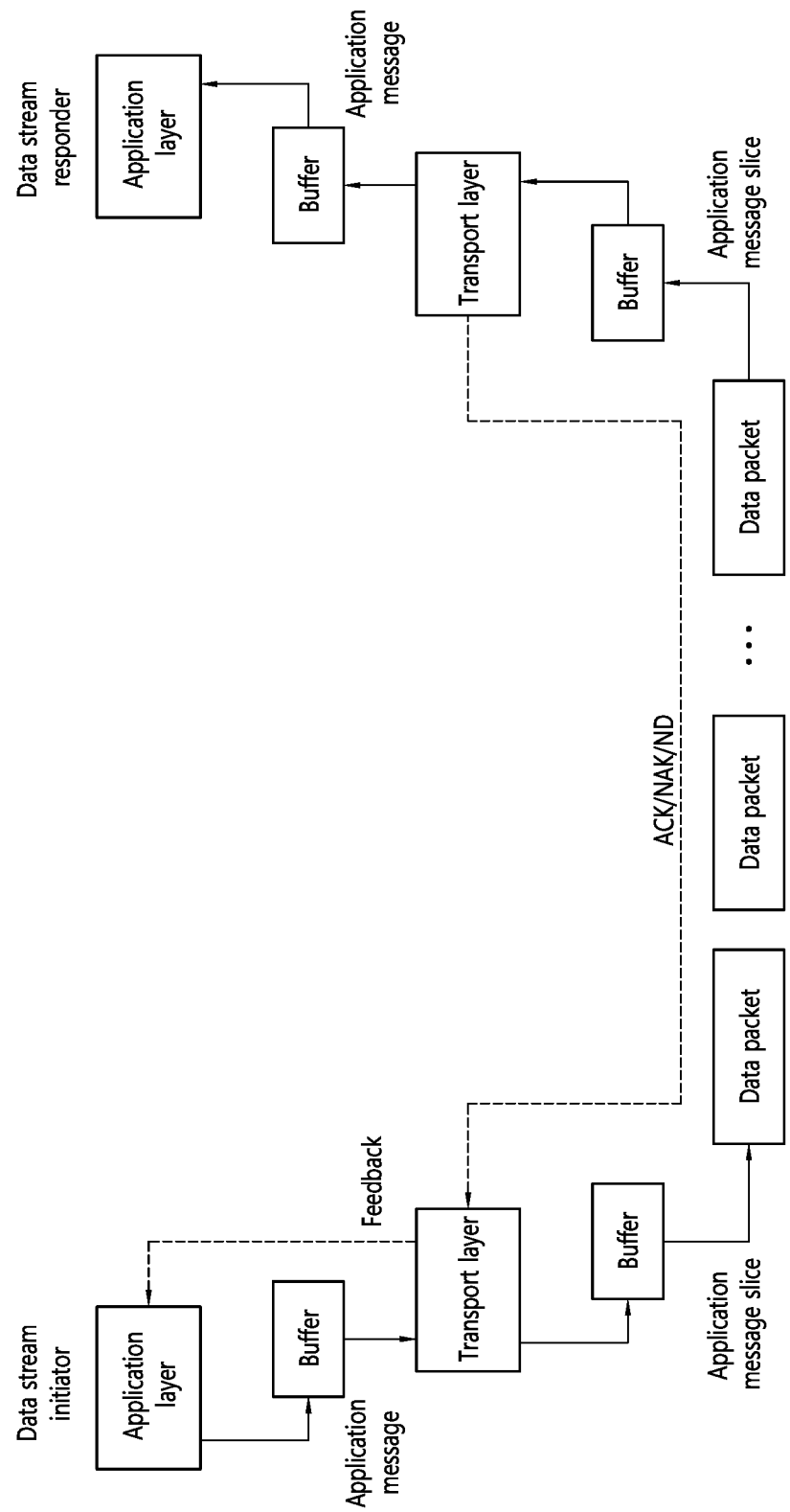
FIG. 9 illustrates a hierarchical architecture for transmitting/receiving an application-level message between a wireless power transmitter and a wireless power receiver according to an example.

FIG. 9 illustrates a hierarchical architecture for transmitting/receiving an application-level message between a wireless power transmitter and a wireless power receiver according to an example.

Referring to FIG. 9, a data stream initiator and a data stream responder transmit/receive a data transport stream in which an application-level message is divided into a plurality of data packets using an application layer and a transport layer.

Both the wireless power transmitter and the wireless power receiver may be data stream initiators or responders. For example, when the data stream initiator is a wireless power receiver, the data stream responder is a wireless power transmitter, and when the data stream initiator is a wireless power transmitter, the data stream responder is a wireless power receiver.

The application layer of the data stream initiator generates an application-level message (application message, for example, an authentication-related message, etc.) and stores it in a buffer managed by the application layer. The application layer of the data stream initiator submits the application message stored in the buffer of the application layer to the transport layer. The transport layer of the data stream initiator stores the received application message in a buffer managed by the transport layer. The size of the buffer of the transport layer may be, for example, at least 67 bytes.

The transport layer of the data stream initiator transmits an application message to the data stream responder through a wireless channel using a data transport stream. In this case, the application message is sliced into a plurality of data packets and transmitted. The plurality of data packets in which the application message is divided and continuously transmitted may be referred to as a data transport stream.

When an error occurs in the process of transmitting data packets, the data stream initiator may retransmit the erroneous packet, in this case, the transport layer of the data stream initiator may perform feedback on the success or failure of message transmission to the application layer.

The data stream responder receives a data transport stream over a radio channel. The received data transport stream is demodulated and decoded in the reverse process of the procedure in which the data stream initiator transmits an application message to the data transport stream. For example, the data stream responder stores the data transport stream in a buffer managed by the transport layer, merges it, and delivers it from the transport layer to the application layer, the application layer can store the received message in a buffer managed by the application layer.

Figure 10:
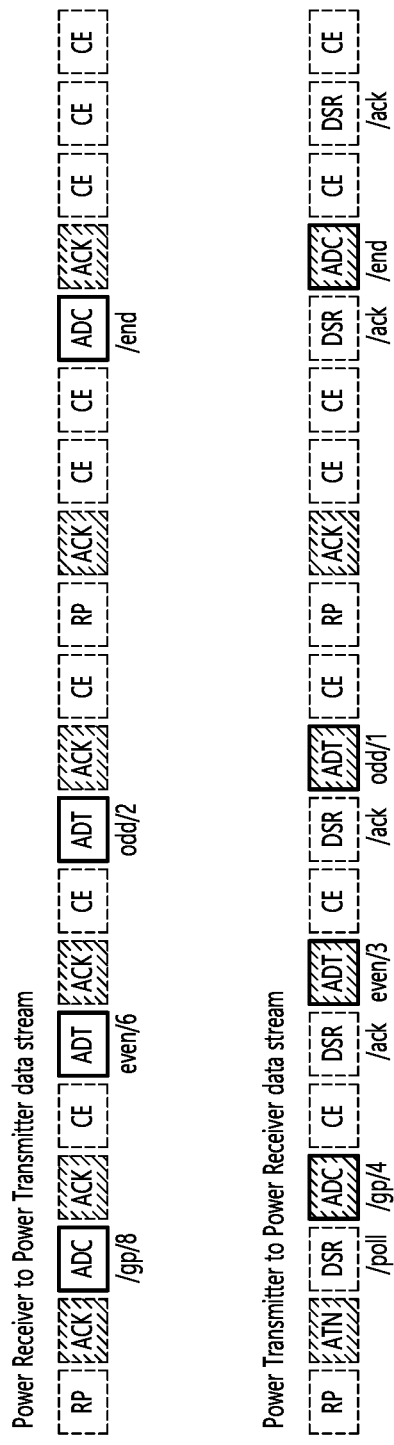
FIG. 10 illustrates a data transport stream between a wireless power transmitter and a wireless power receiver according to an example.

FIG. 10 illustrates a data transport stream between a wireless power transmitter and a wireless power receiver according to an example.

Referring to FIG. 10, a data transport stream may include an auxiliary data control (ADC) data packet and a plurality of consecutive auxiliary data transport (ADT) data packets.

The data stream initiator may open a data transport stream and end the data transport stream using the ADC data packet. That is, the data stream initiator may starts a data transport stream by sending an ADC data packet (ADC/gp/8) or may request the start of a data transport stream, transmit a plurality of ADT data packets in which the application message is slid, and transmit an ADC data packet (ADC/end) to end the data transport stream or request the end of the data transport stream.

Also, the data stream initiator may reset the data transport stream using the ADC data packet.

Figure 11:
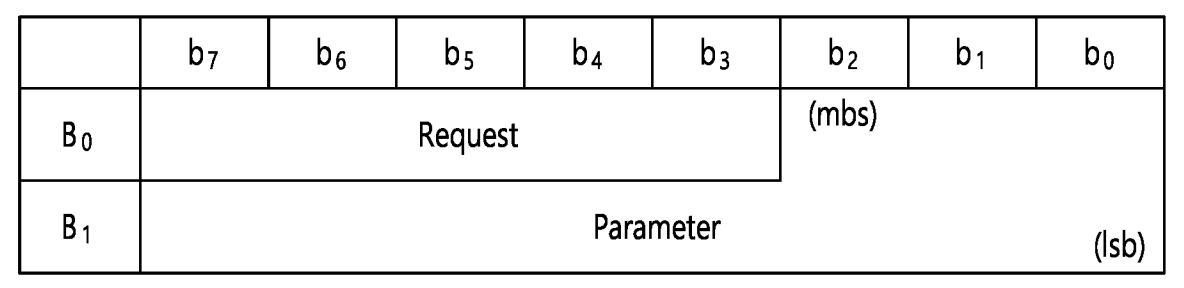
Figure 12:
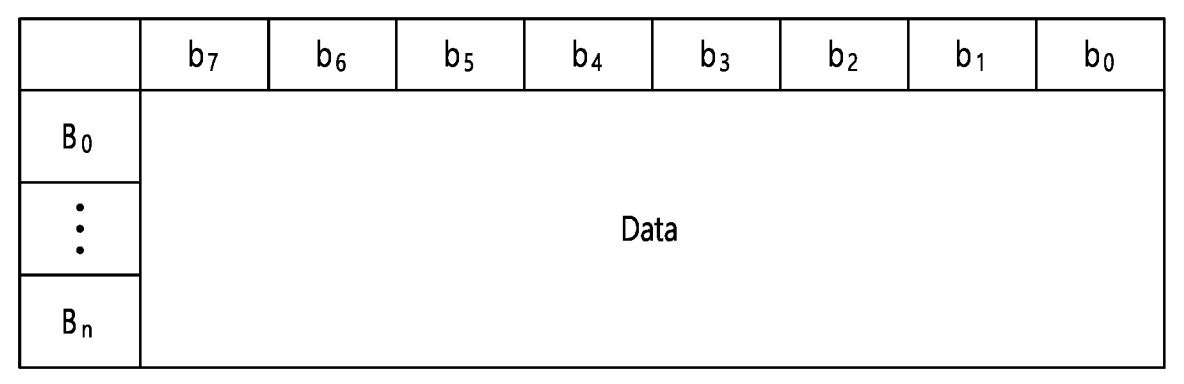

FIG. 11 is a diagram illustrating a format of a message field of an ADC data packet according to an embodiment, and FIG. 12 is a diagram illustrating a format of a message field of an ADT data packet according to an embodiment.

Referring to FIG. 11, the message field of the ADC data packet may consist of 2 bytes (the ADC data packet including the header is 3 bytes), it may include a byte B0 including a request field and a byte B1 including a parameter field.

The ADC data packet may be distinguished according to the value of the request field as ADC that initiates a data transport stream (or requests the start of a data transport stream), ADC that terminates the data transport stream (or requests the termination of the data transport stream), ADC that resets the data transport stream (or requests the reset of the data transport stream). In addition, the ADC data packet may be distinguished according to the value of the request field, which ADC starts the data transport stream for transmitting the application message.

For example, an ADC data packet with a value of 0 in the request field is an ADC (ADC/end) that terminates a data transport stream or requests termination of a data transport stream, the ADC data packet whose request field value is 2 is an ADC (ADC/auth) that starts a data transport stream that transmits an authentication-related message or requests the start of a data transport stream that transmits an authentication-related message, the ADC data packet in which the value of the request field is 5 may be an ADC (ADC/rst) that resets the data transport stream or requests reset of the data transport stream. The ADC data packet whose request field value is any one of 0x10 to 0x1F may be an ADC (ADC/prop) that starts a data transport stream that transmits data other than authentication (e.g., proprietary data) or requests the start of a data transport stream.

The ADC data packet may include information on the number of data bytes of a data transport stream. For this, the parameter field of the ADC data packet starting the data transport stream may include information on the number of bytes of the data transport stream. A parameter field of the ADC (ADC/end) that terminates the data transport stream and/or the ADC (ADC/rst) that resets the data transport stream may be set to 0.

Referring back to FIG. 10, the wireless power transmitter may respond to an ADC data packet transmitted by the wireless power receiver as a data stream initiator to the wireless power transmitter with any one of ACK, NAK, ND, and ATN. When the wireless power transmitter successfully performs a request according to the received ADC data packet, it responds with an ACK, when the request according to the received ADC data packet cannot be performed, it responds with a NAK, when the wireless power transmitter does not support the data transport stream requested by the received ADC data packet, it responds with ND, when the wireless power transmitter requests permission for communication from the wireless power receiver, it can respond with ATN.

As a data stream initiator, the wireless power receiver may respond to the ADC data packet transmitted by the wireless power transmitter to the wireless power receiver using a Data Stream Response (DSR) data packet having a 1-byte message field. For example, the wireless power receiver may respond with any one of DSR/ack, DSR/nak, DSR/nd, and DSR/poll. The wireless power receiver responds with DSR/ack when the request according to the received ADC data packet is successfully performed, when the request according to the received ADC data packet cannot be performed, it responds with a NAK, when the wireless power receiver does not support the request by the received ADC data packet or the requested data transport stream, it responds with ND, when the last data packet transmitted by the wireless power transmitter is not received, it may respond with DSR/poll.

FIG. 12, the message field of the ADT data packet includes a data field of N bytes. The message field of the ADT data packet may have a size of 1 to 7 bytes. The data field contains the fragment of the application message transmitted through the data transport stream. That is, the application message transmitted through the data transport stream is sliced into a plurality of ADT data packets and transmitted/received through wireless communication (e.g., in-band communication) between the wireless power receiver and the wireless power transmitter.

Referring back to FIG. 10, the wireless power transmitter may respond with any one of ACK, NAK, ND and ATN to the ADT data packet transmitted by the wireless power receiver as a data stream initiator to the wireless power transmitter. When the wireless power transmitter correctly processes the data in the received ADT data packet, it responds with ACK, when the data in the received ADT data packet cannot be processed, it responds with a NAK, when there is no data transport stream being received by the wireless power transmitter, it responds with ND, when the wireless power transmitter requests permission for communication from the wireless power receiver, it can respond with ATN.

As a data stream initiator, the wireless power receiver may respond to the ADT data packet transmitted by the wireless power transmitter to the wireless power receiver using a DSR data packet having a 1-byte message field. For example, the wireless power receiver may respond with any one of DSR/ack, DSR/nak, DSR/nd, and DSR/poll. When the data in the received ADT data packet is accurately processed, the wireless power receiver responds with DSR/ack, when the data in the received ADT data packet cannot be processed, it responds with a NAK, when there is no data transport stream being received by the wireless power receiver, it responds with ND, when the last data packet transmitted by the wireless power transmitter is not received, it may respond with DSR/poll.

As mentioned above, an ADT data packet has a message field of N bytes, when the size of the message field is arbitrarily determined by the data stream initiator, since the environment of the data stream responder receiving the ADT data packet is not considered, the probability of transmission failure of the ADT data packet increases.

Especially, when the wireless power receiver that needs to periodically transmit data packets (e.g., Received Power (RP) data packets, Control Error (CE) data packets) to the wireless power transmitter is a data stream responder, since the wireless power receiver needs to perform the reception of the ADT data packet and the transmission of the response message (DSR data packet) to the received ADT data packet within the transmission period of the periodically transmitted data packet, failure to match the transmission period of periodically transmitted data packets or complete reception of ADT data packets, a problem such as not being able to transmit a response message for the received ADT data packet in a timely manner may occur.

In particular, the wireless power receiver wants to keep the transmission period of the CE data packet shorter in order to stably adjust its operation point using the CE data packet. But, when the wireless power transmitter is the data stream initiator, due to the size of the ADT data packet arbitrarily determined by the wireless power transmitter, it may be difficult for the wireless power receiver to maintain the desired CE data packet transmission period.

In order to solve the above-described problem, the ADT data packet according to an embodiment may have a maximum default size (maximum default size) defined. In particular, the size of the ADT data packet transmitted by the wireless power transmitter may be limited.

For example, the maximum default size of an ADT data packet may be limited to 4 bytes. In this case, the message field of the ADT data packet is a maximum of 3 bytes.

Or, for example, the maximum default size of the message field of the ADT data packet may be limited to 3 bytes. In this case, the ADT data packet can be up to 4 bytes including the header.

For convenience of explanation, an example has been described in which the maximum default size of the ADT data packet is 4 bytes and the maximum default size of the message field of the ADT data packet is 3 bytes, but the present document is not limited thereto. The maximum default size of the ADT data packet or the message field of the ADT data packet may be selected differently in consideration of the communication environment of the wireless power transmitter and the wireless power receiver, the transmission period of the CE data packet or the RP data packet, and the like.

In addition, the wireless power receiver may designate the maximum size of the ADT data packet transmitted by the wireless power transmitter in order to maintain a transmission period of periodically transmitted data packets such as CE data packets desired by the wireless power transmitter.

For example, the wireless power receiver transmits a data packet including information on the maximum size of the ADT data packet transmitted by the wireless power transmitter to the wireless power transmitter before the data transport stream is performed, the wireless power transmitter receiving this may transmit an ADT data packet having a size less than or equal to the maximum size of the ADT data packet limited by the wireless power receiver when transmitting the ADT data packet through the data transport stream later.

Figure 13:
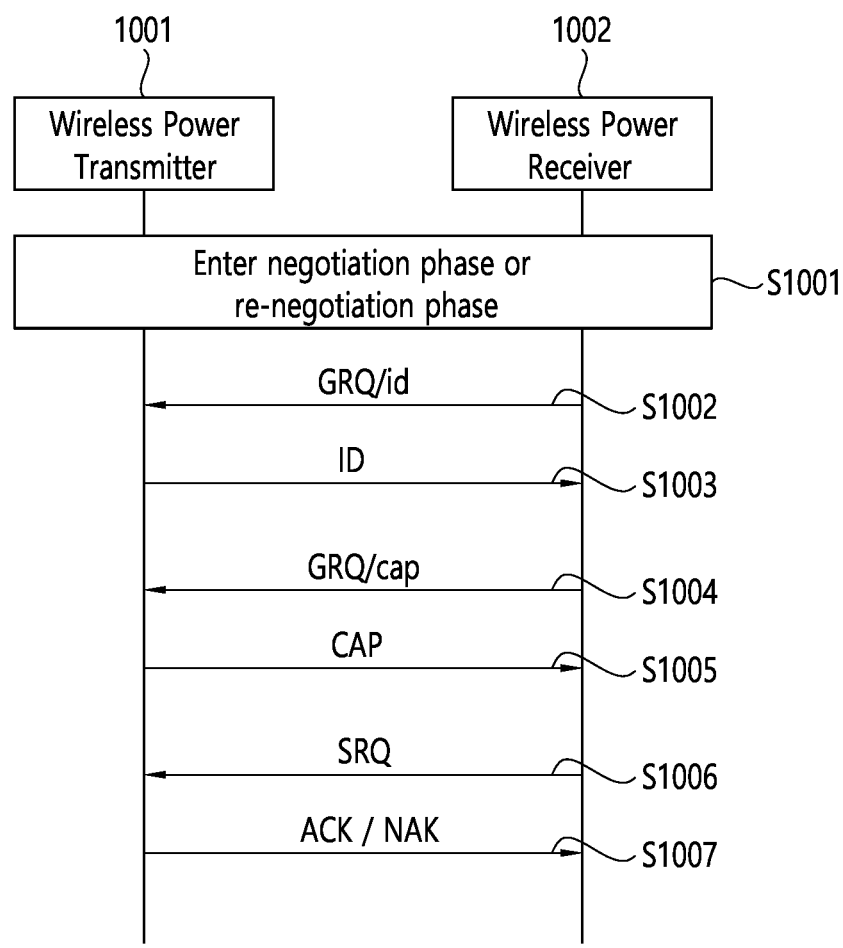
FIG. 13 is a flowchart illustrating a protocol of a negotiation phase or a renegotiation phase according to an embodiment.

FIG. 13 is a flowchart illustrating a protocol of a negotiation phase or a renegotiation phase according to an embodiment.

Referring to FIG. 13, the wireless power transmitter 1001 and the wireless power receiver 1002 enter a negotiation phase or a re-negotiation phase (S1001). Although not shown in FIG. 13, the wireless power transmitter 1001 and the wireless power receiver 1002 enter a negotiation phase through a ping phase, a configuration phase, or may enter the power transfer phase through the ping phase, the configuration phase, and the negotiation phase, and then enter the re-negotiation phase.

In the ping phase, the wireless power transmitter 1001 identifies the wireless power receiver 1002 by transmitting a digital ping. In addition, the wireless power transmitter 1001 may perform foreign object detection before power transmission in order to check whether a foreign object exists in an operating volume. The wireless power receiver 1002 receiving the digital ping transmits a signal strength data packet (SIG) to the wireless power transmitter 1001, the wireless power transmitter 1001 receiving the SIG from the wireless power receiver 1002 may identify that the wireless power receiver 1002 is located in an operating volume.

In the configuration phase, the wireless power receiver 1002 transmits its identification information to the wireless power transmitter, the wireless power receiver 1002 and the wireless power transmitter 1001 may establish a baseline power transfer contract. The wireless power receiver 1002 may transmit an identification data packet (ID) and an extended identification data packet (XID) to the wireless power transmitter 1001 to identify itself, for a power transfer contract, a power control hold-off data packet (PCH) and a configuration data packet (CFG) may be transmitted to the wireless power transmitter 1001.

In the negotiation phase, the power transfer contract related to the reception/transmission of wireless power between the wireless power receiver 1002 and the wireless power transmitter 1001 is expanded or changed, or a renewal of the power transfer contract may be made which adjusts at least some of the elements of the power transfer contract. In addition, in the negotiation phase or the renegotiation phase, the wireless power receiver may transmit a data packet including information on the maximum size of the ADT data packet to the wireless power transmitter.

Since other details of the ping phase, the configuration phase, and the negotiation phase have been described in FIG. 5 and the like, additional descriptions thereof will be omitted.

Referring to FIG. 13, the wireless power receiver 1002 may receive an identification data packet (ID) and a capabilities data packet (CAP) of the wireless power transmitter 1001 using a general request data packet (GRQ).

The GRQ packet includes a 1-byte Requested Power Transmitter Data Packet field (a data packet field of the requested wireless power transmitter). The Requested Power Transmitter Data Packet field may include a header value of a data packet that the wireless power receiver 1002 requests from the wireless power transmitter 1001 using the GRQ packet. For example, when the wireless power receiver 1002 requests the ID packet of the wireless power transmitter 1001 using the GRQ packet, the wireless power receiver 1002 transmits a GRQ packet (GRQ/id) including a header value (0x30) of the ID packet of the wireless power transmitter 1001 in the Requested Power Transmitter Data Packet field.

In the negotiation phase or renegotiation phase, the wireless power receiver 1002 may transmit a GRQ packet (GRQ/id) requesting the ID packet of the wireless power transmitter 1001 to the wireless power transmitter 1001 (S1002).

The wireless power transmitter 1001 receiving the GRQ/id may transmit the ID packet to the wireless power receiver 1002 (S1003). The ID packet of the wireless power transmitter 1001 includes information on the Manufacturer Code. The ID packet including information on the Manufacturer Code allows the manufacturer of the wireless power transmitter 1001 to be identified.

The wireless power receiver 1002 may transmit a GRQ packet (GRQ/cap) requesting the CAP packet of the wireless power transmitter 1001 to the wireless power transmitter 1001 (S1004). The Requested Power Transmitter Data Packet field of the GRQ/cap may include a header value (0x31) of the CAP packet.

The wireless power transmitter 1001 that has received the GRQ/cap may transmit the CAP packet to the wireless power receiver 1002 (S1005). The CAP packet of the wireless power transmitter 1001 includes information related to the performance of the wireless power transmitter 1001. For example, in the CAP packet of the wireless power transmitter 1001, information about Negotiable Load Power, Potential Load Power, whether to support simultaneous data reception/transmission (Dup), whether or not the authentication function is supported (AR), Out-of-band communication support (OB) may be included.

The wireless power receiver 1002 may update the elements of the Power Transfer Contract related to the power to be provided in the power transmission phase using a specific request data packet (SRQ) in the negotiation phase or the renegotiation phase, and the negotiation phase or the renegotiation phase can be terminated.

In addition, the wireless power receiver 1002 may transmit a data packet including information on the maximum size of the ADT data packet transmitted by the wireless power transmitter to the wireless power transmitter using the SRQ packet.

Figure 14:
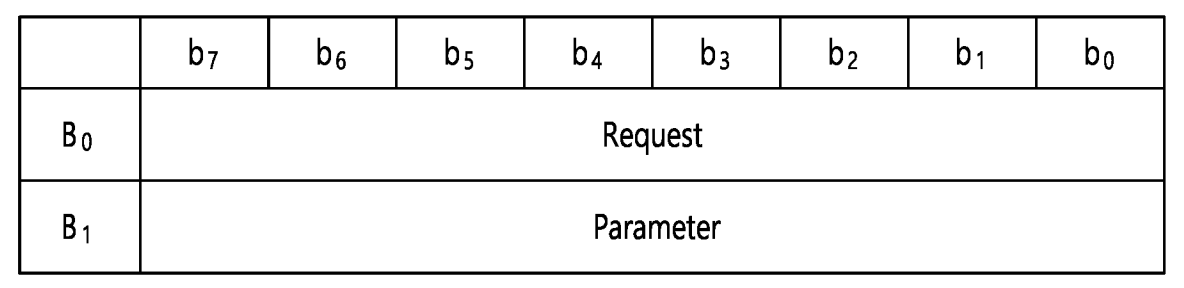

FIG. 14 is a diagram illustrating a format of a message field of an SRQ packet according to an example. Referring to FIG. 14, the message field of the SRQ packet may include a byte B0 including a Request field and a byte B1 including a Parameter field.

As the request values of the current SRQ packet, since 0x00, 0x01, 0x02, 0x03, 0x04 and 0x05 are already used as SRQ/en, SRQ/gp, SRQ/rpr, SRQ/fsk, SRQ/rp, SRQ/rep, respectively, the request value of SRQ (SRQ/ADT) used to deliver information on the maximum size of the ADT data packet transmitted by the wireless power transmitter can be used as a value other than 0x00, 0x01, 0x02, 0x03, 0x04 and 0x05. For example, the Request value of SRQ/ADT may be 0x07 or 0x08.

The parameter field of SRQ/ADT may include information on the maximum size of the ADT data packet transmitted by the wireless power transmitter. For example, if you want to designate the maximum size of the ADT data packet transmitted by the wireless power transmitter as 7B, the wireless power receiver 1002 may set the value of the parameter field of the SRQ/ADT to '00000111'b.

Alternatively, the parameter field of the SRQ/ADT may include information on the maximum size of the message field of the ADT data packet transmitted by the wireless power transmitter. For example, if you want to designate the maximum size of the message field of the ADT data packet transmitted by the wireless power transmitter as 6B, the wireless power receiver 1002 may set the value of the parameter field of the SRQ/ADT to '000001101'b. If the maximum size of the message field of the ADT data packet is 6B, the wireless power transmitter 1001 may transmit an ADT data packet of up to 7B including a header.

The wireless power transmitter 1001 receiving the SRQ/ADT may respond only with ACK.

According to the Qi specification of the wireless power consortium (WPC) currently being discussed, ADT data packets including headers are 2 to 8 bytes. However, when the communication speed of the frequency shift keying (FSK), which is a modulation method in which the wireless power transmitter 1001 transmits data to the wireless power receiver 1002, is improved, the maximum size of the ADT data packet transmitted by the wireless power transmitter may be increased to 2 times, 3 times, etc. of 2 to 8 bytes.

As described above, it is assumed that the wireless power transmitter 1001 receives the SRQ/ADT from the wireless power receiver 1002 in the negotiation phase or the renegotiation phase, and the maximum size of the ADT data packet is specified. Referring again to FIG. 10, when the wireless power transmitter transmits a data transport stream to the wireless power receiver, the wireless power transmitter requests the start of a data transport stream by sending an ADC data packet, after receiving the ADC data packet, the wireless power receiver transmits the CE data packet and transmits the DSR/ack as a response packet to the ADC data packet.

The wireless power transmitter receiving the DSR/ack from the wireless power receiver transmits ADT data packets. At this time, since the wireless power transmitter is constrained by the maximum size of the ADT data packet included in the SRQ/ADT or the maximum size of the message field of the ADT data packet, ADT data packets with a maximum size or less or ADT data packets containing a message field with a maximum size or less are transmitted.

The wireless power receiver transmits a response packet (DSR/ack) for each ADT data packet received from the wireless power transmitter, between the reception of the ADT data packets and the transmission of the response packet (DSR/ack), the CE data packet and the RP data packet are transmitted according to the transmission period.

The wireless power transmitter that has transmitted all ADT data packets transmits the ADC data packet requesting the end of the data transport stream to the wireless power receiver. Upon receiving the ADC data packet, the wireless power receiver transmits a CE data packet and transmits a DSR/ack as a response packet to the ADC data packet, thereby terminating the data transport stream.

On the other hand, if the wireless power receiver does not specify the maximum size of the ADT data packet transmitted by the wireless power transmitter in the negotiation phase or renegotiation phase, the size of the ADT data packet transmitted by the wireless power transmitter or the size of the message field of the ADT data packet transmitted by the wireless power transmitter may be limited to a maximum default size.

As mentioned above, according to the present specification, since the maximum size of the ADT data packet transmitted by the wireless power transmitter is limited, or the maximum size of the ADT data packet transmitted by the wireless power transmitter is specified by the wireless power receiver, the wireless power receiver may normally transmit data packets (eg, CE data packets and RP data packets) to be periodically transmitted regardless of the data transport stream in the process of receiving the data transport stream.

The wireless power transmission apparatus in the embodiment according to the above-described FIGS. 9 to 14 corresponds to the wireless power transmission apparatus or the wireless power transmitter or the power transmission unit disclosed in FIGS. 1 to 8. Accordingly, the operation of the wireless power transmitter in this embodiment is implemented by one or a combination of two or more of each component of the wireless power transmitter in FIGS. 1 to 8. For example, reception/transmission of data packets according to FIGS. 9 to 14 is included in the operation of the communication/control unit 120, 710 or 790.

The wireless power receiving apparatus in the embodiment according to the above-described FIGS. 9 to 14 corresponds to the wireless power receiving apparatus or the wireless power receiver or the power receiving unit disclosed in FIGS. 1 to 8. Accordingly, the operation of the wireless power receiver in this embodiment is implemented by one or a combination of two or more of the respective components of the wireless power receiver in FIGS. 1 to 8. For example, reception/transmission of data packets according to FIGS. 9 to 14 may be included in the operation of the communication/control unit 220, 810, or 890.

Since all components or steps are not essential for the wireless power transmission method and apparatus, or the reception apparatus and method according to the embodiment of the present document described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each component or step described above does not necessarily have to be performed in the order described, it is also possible that the steps described later are performed prior to the steps described earlier.

The above description is merely illustrative of the technical spirit of the present document, and various modifications and variations will be possible without departing from the essential characteristics of the present document by those skilled in the art to which the present document pertains. Accordingly, the embodiments of the present document described above may be implemented separately or in combination with each other.

Therefore, the embodiments disclosed in the present document are not intended to limit the technical spirit of the present document, but to explain, and the scope of the technical spirit of the present document is not limited by these embodiments. The protection scope of the present document should be interpreted by the following claims, and all technical ideas within the scope equivalent thereto should be construed as being included in the scope of the present document.

What is claimed is:

1. A wireless power receiver for receiving a wireless power from a wireless power transmitter comprising:
    a power pickup circuit configured to receive the wireless power from the wireless power transmitter; and
    a communication/control circuit configured to communicate with the wireless power transmitter and control the wireless power,
    wherein the communication/control circuit is configured to:
    be available for transmitting and receiving an application-level message to and from the wireless power transmitter using a data transport stream including an auxiliary data control (ADC) packet and a plurality of auxiliary data transport (ADT) packets which is consecutive, and
    transmit a data packet including information for a maximum size of an ADT packet to the wireless power transmitter,
    wherein the data packet comprises one of special request (SRQ) packets comprising a request field and a parameter field, and
    wherein the parameter field includes information for the maximum size.

2. The wireless power receiver of claim 1, wherein the information is the maximum size of the ADT packet.

3. The wireless power receiver of claim 1, wherein the information is the maximum size of a message field of the ADT packet.

4. The wireless power receiver of claim 1, wherein the communication/control circuit is configured to:
    communicate with the wireless power transmitter according to a protocol including a ping phase, a configuration phase, a negotiation phase and a power transfer phase,
    wherein the data packet is transmitted to the wireless power transmitter in the negotiation phase.

5. The wireless power receiver of claim 1, wherein the request field includes one byte and the parameter field includes one byte.

6. A method of receiving a message from a wireless power transmitter using a data transport stream including a plurality of auxiliary data transport (ADT) packets which is consecutive, the method performed by a wireless power receiver and comprising:
    transmitting, to the wireless power transmitter, a data packet including information for a maximum size of an ADT packet that can be transmitted by the wireless power transmitter;
    receiving, from the wireless power transmitter, a first auxiliary data control (ADC) packet for opening the data transport stream;
    transmitting, to the wireless power transmitter, a response packet for the first ADC packet;
    receiving, from the wireless power transmitter, the plurality of ADT packets of less than or equal to the maximum size;
    transmitting, to the wireless power transmitter, a response packet for each of the plurality of ADT packets;
    receiving, from the wireless power transmitter, a second ADC packet for ending the data transport stream; and
    transmitting, to the wireless power transmitter, a response packet for the second ADC packet,
    wherein the data packet comprises one of special request (SRQ) packets comprising a request field and a parameter field, and
    wherein the parameter field includes information for the maximum size.

7. The method of claim 6, wherein the information is the maximum size of the ADT packet.

8. The method of claim 6, wherein the information is the maximum size of a message field of the ADT packet.

9. The method of claim 6, wherein the wireless power receiver communicates with the wireless power transmitter according to a protocol including a ping phase, a configuration phase, a negotiation phase and a power transfer phase,
    wherein the data packet is transmitted to the wireless power transmitter in the negotiation phase.

10. The method of claim 6, wherein the request field includes one byte and the parameter field includes one byte.

11. A wireless power transmitter for transferring a wireless power to a wireless power receiver comprising:
    a power conversion circuit configured to transmit the wireless power to the wireless power receiver; and
    a communication/control circuit configured to communicate with the wireless power receiver and control the wireless power,
    wherein the communication/control circuit is configured to:
    be available for transmitting and receiving an application-level message to and from the wireless power receiver using a data transport stream including an auxiliary data control (ADC) packet and a plurality of auxiliary data transport (ADT) packets which is consecutive,
    receive a data packet including information for a maximum size of an ADT packet from the wireless power receiver, and
    transmit the ADT packet having a size less than or equal to the maximum size to the wireless power receiver,
    wherein the data packet comprises one of special request (SRQ) packets comprising a request field and a parameter field, and
    wherein the parameter field includes information for the maximum size.

12. The wireless power transmitter of claim 11, wherein the information is the maximum size of the ADT packet.

13. The wireless power transmitter of claim 11, wherein the information is the maximum size of a message field of the ADT packet.

14. The wireless power transmitter of claim 11, wherein the communication/control circuit is configured to:
    communicate with the wireless power receiver according to a protocol including a ping phase, a configuration phase, a negotiation phase and a power transfer phase,
    wherein the data packet is received from the wireless power receiver in the negotiation phase.

15. The wireless power transmitter of claim 11, wherein the request field includes one byte and the parameter field includes one byte.

* * * * *